United States Patent
Sato

(10) Patent No.: US 11,347,945 B2
(45) Date of Patent: May 31, 2022

(54) INFORMATION PROCESSING APPARATUS AND NON-TRANSITORY COMPUTER READABLE MEDIUM STORING PROGRAM

(71) Applicant: FUJIFILM BUSINESS INNOVATION CORP., Tokyo (JP)

(72) Inventor: Yusuke Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 159 days.

(21) Appl. No.: 16/542,352

(22) Filed: Aug. 16, 2019

(65) Prior Publication Data

US 2020/0293620 A1    Sep. 17, 2020

(30) Foreign Application Priority Data

Mar. 14, 2019 (JP) .............................. JP2019-046795

(51) Int. Cl.
*G06F 3/048* (2013.01)
*G06F 40/30* (2020.01)
*G06F 3/0482* (2013.01)

(52) U.S. Cl.
CPC ............ *G06F 40/30* (2020.01); *G06F 3/0482* (2013.01)

(58) Field of Classification Search
CPC .................................................. G06F 3/0482
See application file for complete search history.

(56) References Cited

U.S. PATENT DOCUMENTS

| | | | | |
|---|---|---|---|---|
| 2008/0307314 A1* | 12/2008 | Cisler | ................... | G06F 16/168 715/738 |
| 2010/0188697 A1* | 7/2010 | Maeda | ............... | H04N 1/00474 358/1.15 |
| 2011/0214077 A1* | 9/2011 | Singh | ...................... | G06F 9/451 715/762 |
| 2013/0198596 A1* | 8/2013 | Angelillo | .............. | G06F 40/103 715/205 |
| 2013/0246973 A1* | 9/2013 | Tomiyasu | .......... | H04N 1/00482 715/830 |
| 2016/0173433 A1* | 6/2016 | Bastide | ................. | G06F 16/358 709/206 |

FOREIGN PATENT DOCUMENTS

JP    2012-123882 A    6/2012

* cited by examiner

*Primary Examiner* — Claudia Dragoescu
(74) *Attorney, Agent, or Firm* — Oliff PLC

(57) ABSTRACT

An information processing apparatus includes a controller that performs control so that a portion including a specified character string, which is specified through an operation by a user, in a list linking plural character string groups belonging to plural groups is displayed in a display area, operator images are displayed to receive an operation performed by the user for selecting one or more groups out of the plural groups, and an index associated with the one or more selected groups is displayed among plural indexes that are associated with the plural groups and used for receiving an operation for selecting a specific character string included in the character string groups, and a specifier that specifies, as the specified character string, the specific character string selected through the operation for the displayed index.

17 Claims, 10 Drawing Sheets

FIG. 6

| CHARACTER STRING | INDEX INFORMATION | GROUP |
|---|---|---|
| ASHIKAGA YOSHIMITSU | a | JAPANESE |
| SAKAMOTO RYOMA | sa | JAPANESE |
| TAIRA NO KIYOMORI | ta | JAPANESE |
| TOKUGAWA IEYASU | ta | JAPANESE |
| BARACK | A-B | ENGLISH |
| DONALD | C-D | ENGLISH |
| GEORGE | G-H | ENGLISH |
| JOHN | I-K | ENGLISH |
| CAO CAO MENGDE | a-b | CHINESE |
| LIU BEI XUANDE | l-n | CHINESE |
| SIMA YI ZHONGDA | r-t | CHINESE |
| SUN QUAN ZHONGMOU | r-t | CHINESE |
| . . . | . . . | . . . |

FIG. 7

| GROUP | INDEX DISPLAY ON/OFF |
|---|---|
| JAPANESE | ON |
| ENGLISH | OFF |
| CHINESE | OFF |
| OTHERS | OFF |

| GROUP | INDEX DISPLAY ON/OFF | NUMBER OF CHARACTER STRINGS |
| --- | --- | --- |
| JAPANESE | ON | 5 |
| ENGLISH | ON | 5 |
| CHINESE | OFF | 4 |
| OTHERS | OFF | 2 |

| GROUP | INDEX DISPLAY ON/OFF | FREQUENCY OF USE (MONTHLY BASIS) |
| --- | --- | --- |
| JAPANESE | ON | 50 |
| ENGLISH | ON | 30 |
| CHINESE | OFF | 15 |
| OTHERS | OFF | 20 |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-046795 filed Mar. 14, 2019.

BACKGROUND

(i) Technical Field

The present disclosure relates to an information processing apparatus and a non-transitory computer readable medium storing a program.

(ii) Related Art

Japanese Unexamined Patent Application Publication No. 2012-123882 describes a technology in which lists of data expressed in a plurality of languages are displayed and, when a user gives a skipping instruction for groups, a subsequent group in the same language is displayed if a list for a language subjected to grouping is currently displayed or a subsequent language is displayed by skipping if a list for a language that is not subjected to grouping is displayed.

SUMMARY

Aspects of non-limiting embodiments of the present disclosure relate to the following circumstances. When indexing is used for displaying a specific character string at the head but when too many character strings are specifiable at the head, index characters become small and an operation becomes difficult to perform. The operation difficulty is eliminated when skip buttons are provided as in the technology described above. For example, if a user desires to display a specific group in a different language, however, groups are first skipped until the desired language is displayed. After the desired language is displayed, groups then need to be skipped until the desired group is displayed. Therefore, it takes a great deal of time and effort.

It is desirable that, when group-based indexes are available in a list linking a plurality of character string groups belonging to a plurality of groups, time and effort required until a desired character string is found are reduced while facilitating an operation for indexes compared with a case in which the configuration of the non-limiting embodiments of the present disclosure is not provided.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising a controller that performs control so that a portion including a specified character string, which is specified through an operation by a user, in a list linking a plurality of character string groups belonging to a plurality of groups is displayed in a display area, operator images are displayed to receive an operation performed by the user for selecting one or more groups out of the plurality of groups, and an index associated with the one or more selected groups is displayed among a plurality of indexes that are associated with the plurality of groups and used for receiving an operation for selecting a specific character string included in the character string groups, and a specifier that specifies, as the specified character string, the specific character string selected through the operation for the displayed index.

BRIEF DESCRIPTION OF THE DRAWINGS

An exemplary embodiment of the present disclosure will be described in detail based on the following figures, wherein:

FIG. 6 illustrates an example of list information;

FIG. 7 illustrates an example of selection status information;

DETAILED DESCRIPTION

[1] Exemplary Embodiment

Figure 1:
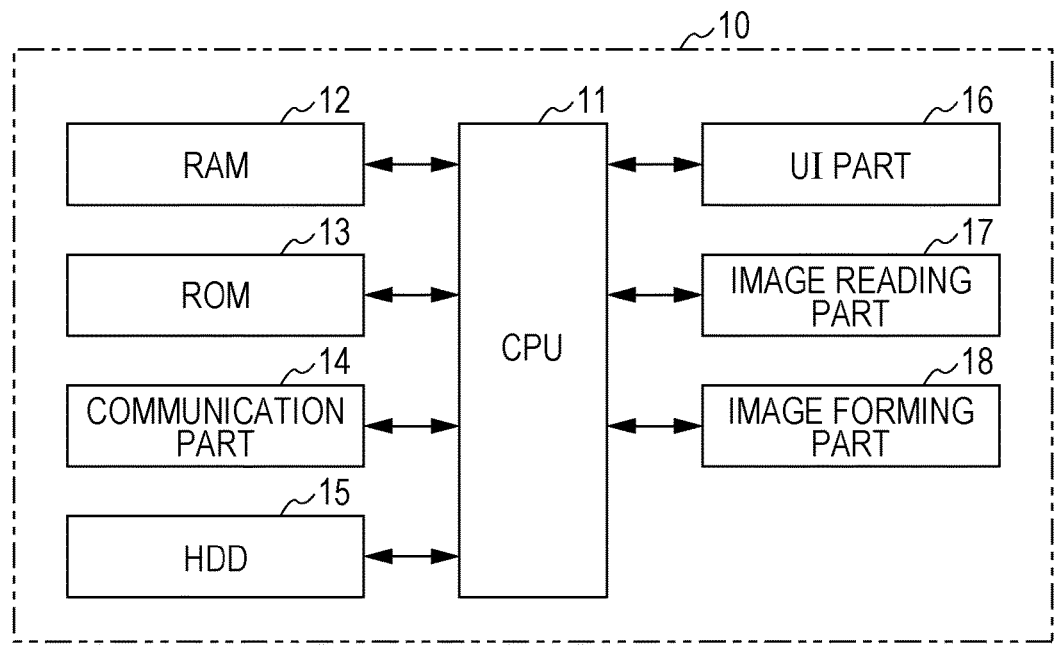
FIG. 1 illustrates the hardware configuration of an image processing apparatus according to an exemplary embodiment.

FIG. 1 illustrates the hardware configuration of an image processing apparatus 10 according to an exemplary embodiment. The image processing apparatus 10 is a computer including devices such as a central processing unit (CPU) 11, a random access memory (RAM) 12, a read only memory (ROM) 13, a communication part 14, a hard disk drive (HDD) 15, a UI part 16, an image reading part 17, and an image forming part 18. The image processing apparatus 10 is an example of an "information processing apparatus" of the exemplary embodiment of the present disclosure.

The CPU 11 controls operations of the respective parts by executing a program stored in the ROM 13 or the HDD 15 while using the RAM 12 as a working area. The communication part 14 includes an antenna, a communication circuit, and the like and performs communication via a communication network. The communication part 14 further includes a FAX modem and performs facsimile communication. The HDD 15 stores data and programs to be used by the CPU 11 for control.

The UI part 16 includes a display that is a display unit and a touch screen (referred to also as an operation panel) having a touch panel provided on the surface of the display. The UI part 16 displays an image and receives a user's operation. The UI part 16 includes an operator such as a keyboard as well as the touch screen and receives an operation for the operator. The image reading part 17 is a scanner that reads an image from a medium set on the image processing apparatus 10. For example, the image forming part 18 forms an image on a medium by transferring and fixing the image by an electrophotographic system.

The CPU 11 of the image processing apparatus 10 controls the respective parts by executing the program stored in the HDD 15 or the like to implement the following functions.

Figure 2:
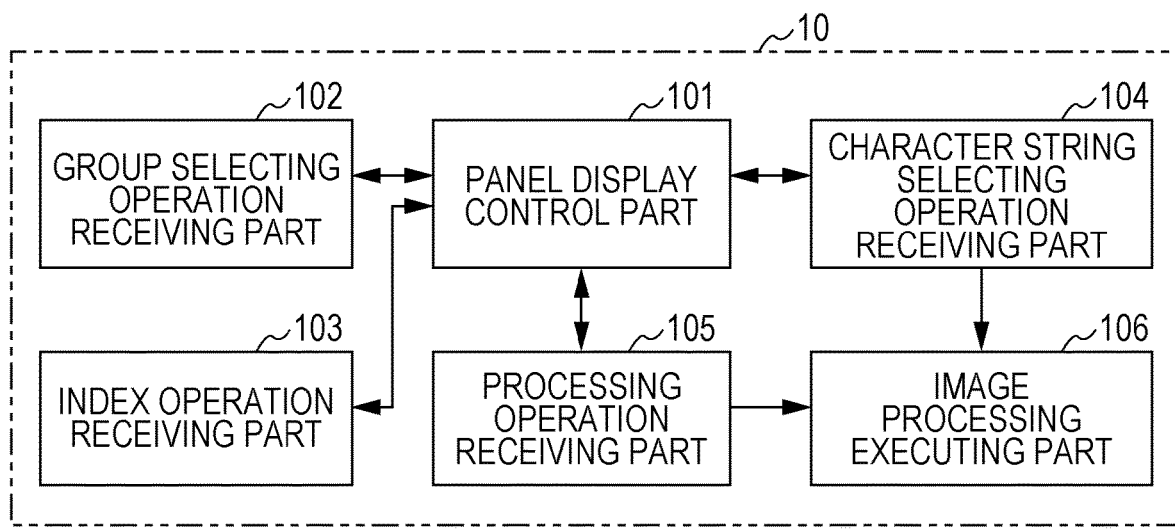
FIG. 2 illustrates a functional configuration implemented by the image processing apparatus.

FIG. 2 illustrates a functional configuration implemented by the image processing apparatus 10. The image processing apparatus 10 includes a panel display control part 101, a group selecting operation receiving part 102, an index operation receiving part 103, a character string selecting operation receiving part 104, a processing operation receiving part 105, and an image processing executing part 106.

The panel display control part 101 controls the operation panel (touch screen) of the image processing apparatus 10 to display an image. The panel display control part 101 is an example of a "controller" of the exemplary embodiment of the present disclosure. For example, the panel display control part 101 displays a list linking a plurality of character string groups belonging to a plurality of groups. Examples of the list include a company directory, an email address list, an extension number list, an article list, a customer list, and a list of instruction manuals or help messages. Character strings and groups are used depending on the purpose of each list.

For example, if the list is the company directory, a character string indicating one name or one extension number and a group indicating a common department in a company or a common office are used. If the list is the article list, a character string indicating one article name or one article number and a group indicating a common article category or a common article price range are used. In this exemplary embodiment, the panel display control part 101 displays a FAX destination list.

Figure 3:
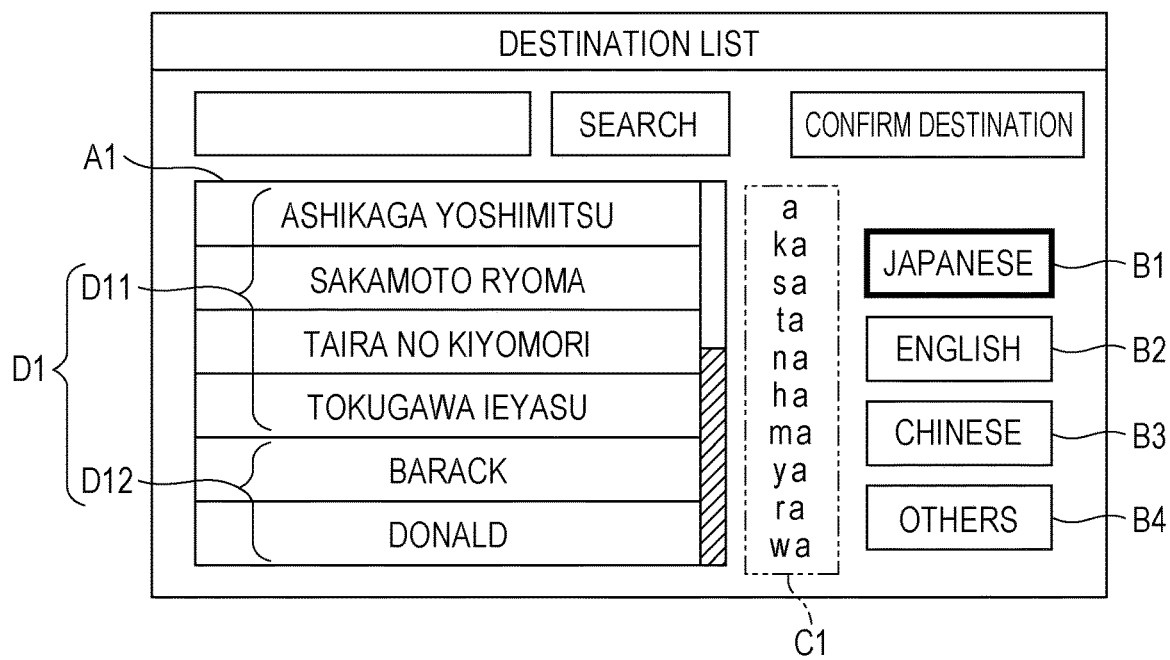
FIG. 3 illustrates an example of a displayed destination list.

FIG. 3 illustrates an example of the displayed destination list. In the example of FIG. 3, the panel display control part 101 displays a destination list D1 in a list display area A1. The destination list D1 is a list of character strings indicating names of persons as FAX destinations. The destination list D1 includes a Japanese character string group D11 belonging to a Japanese group, and an English character string group D12 belonging to an English group.

The destination list D1 includes a Chinese character string group and a character string group for other languages as well. Thus, the destination list D1 is a list linking a plurality of character string groups belonging to groups for different languages. The panel display control part 101 displays as many character strings included in the destination list D1 as those displayable in the list display area A1. In the example of FIG. 3, four character strings are included in the Japanese character string group D11 and six character strings are displayable in the list display area A1. Therefore, two character strings of the English character string group D12 are also displayed below the Japanese character string group D11.

The panel display control part 101 performs control so that a portion of the destination list D1 that includes a specified character string that is specified through a user's operation is displayed in the display area. In this exemplary embodiment, the panel display control part 101 displays, in the list display area A1, six character strings (maximum number of character strings displayable in the list display area A1) including the specified character string and five character strings subsequent to the specified character string. Therefore, the panel display control part 101 displays the specified character string at the top of the list display area A1, that is, at the head of the list display area A1. The display position of the specified character string is not limited to the head but may be any other position.

In initial display, the panel display control part 101 determines that the specified character string is a first character string in the destination list D1 (in the example of FIG. 3, "ASHIKAGA YOSHIMITSU") and displays the character string as illustrated in FIG. 3. For example, when the user scrolls the destination list D1 upward in this state, the panel display control part 101 determines that the specified character string is shifted downward to each subsequent character string and displays each character string at the head of the list display area A1 with the downward shift.

The panel display control part 101 performs control so that operator images (hereinafter referred to as "group selection images") are displayed to receive a user's operation for selecting one or more groups out of the plurality of groups. The operator images are displayed on the touch screen and, when an operation such as tapping is performed, a predetermined operation (operation for selecting one or more groups in the case of the group selection image) is received.

In the example of FIG. 3, the panel display control part 101 displays, as the group selection images, language selection buttons including a Japanese selection button B1, an English selection button B2, a Chinese selection button B3, and an others selection button B4 on a right side of the destination list D1. The group selecting operation receiving part 102 receives an operation for the displayed group selection images as the user's operation for selecting one or more groups out of the plurality of groups.

When the user pushes a desired language selection button, the group selecting operation receiving part 102 receives this operation as a group selecting operation and reports the selected group to the panel display control part 101. The panel display control part 101 performs control for displaying an index associated with the reported group, that is, the one or more groups selected through the operation received by the group selecting operation receiving part 102.

The index is an operator image group associated with each of the plurality of groups and used for receiving an operation for selecting a specific character string included in the character string group. Each operator image included in the index is hereinafter referred to as "index image". In the example of FIG. 3, the Japanese selection button B1 is selected and therefore the panel display control part 101 displays the selected Japanese selection button B1 with emphasis (with a thick outline).

The panel display control part 101 displays a Japanese index C1 associated with the selected Japanese between the list display area A1 and the display area for the language selection buttons. The index images of the Japanese index C1 are an array of initial characters of Japanese alphabetical arrays, such as "a", "ka", "sa", "ta", "na", "ha", "ma", "ya", "ra", and "wa". The index operation receiving part 103 specifies, as the specified character string, the specific character string selected through the operation for the displayed index and reports the specified character string to the panel display control part 101. The index operation receiving part 103 is an example of a "specifier" of the exemplary embodiment of the present disclosure.

For example, when a Japanese alphabetical array beginning with "a" is selected through the user's operation, the index operation receiving part 103 specifies, as the specified character string, a character string (in the example of FIG. 3, "ASHIKAGA YOSHIMITSU") located at the top of the destination list D1 among character strings beginning with any characters in the Japanese alphabetical array beginning with "a". The panel display control part 101 performs control so that a portion including the reported specified character string is displayed in the display area.

Figure 4:
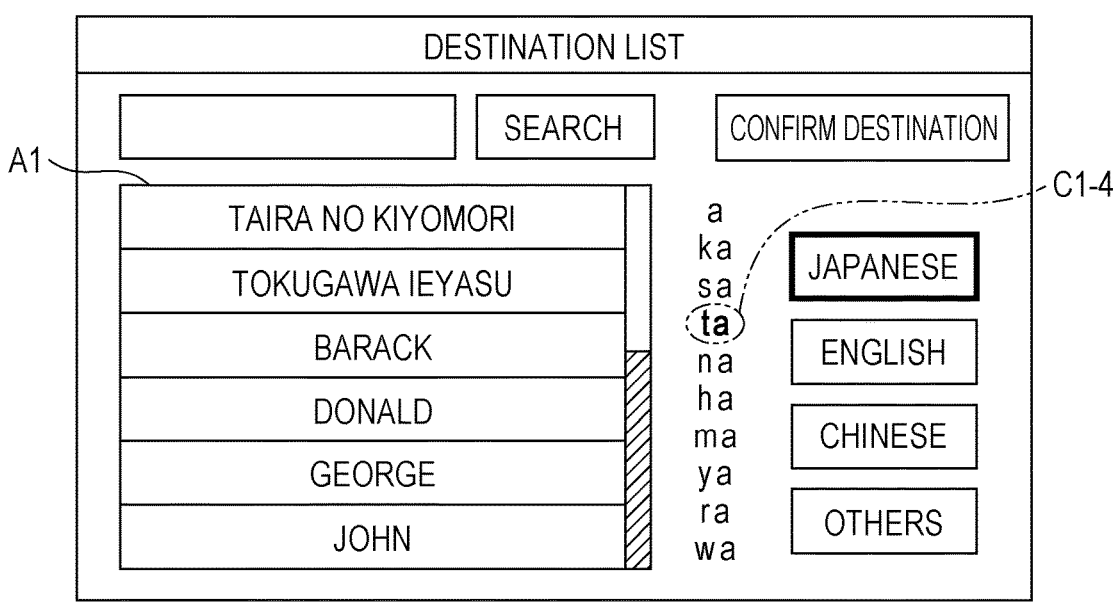
FIG. 4 illustrates a display example when an index image is selected.

FIG. 4 illustrates a display example when an index image is selected. In the example of FIG. 4, the user selects an index image C1-4 represented by "ta" in the Japanese index C1. In this case, the index operation receiving part 103 specifies, as the specified character string, a character string (in the example of FIG. 3, "TAIRA NO KIYOMORI") located at the top of the destination list D1 among character strings beginning with any characters in a Japanese alphabetical array beginning with "ta". The panel display control part 101 performs control so that the specified character string "TAIRA NO KIYOMORI" is displayed at the head of the list display area A1.

The user performs an operation for selecting any destination from the destination list D1 displayed as described above. The character string selecting operation receiving part 104 receives this operation as an operation for selecting a specific character string associated with each of the plurality of groups and included in the character string group. The user performs an instruction operation for FAX sending to the selected destination. The processing operation receiving part 105 receives this operation as an instruction operation for FAX sending processing.

The image processing executing part 106 executes the FAX sending processing that is image processing under the instruction given via the processing operation receiving part 105. For example, the image processing executing part 106 causes the image reading part 17 to read an image and the communication part 14 to send the image. In the examples of FIG. 3 and FIG. 4, Japanese is selected as the index language but other languages may be selected. For example, if the English selection button B2 is pushed on the screen of FIG. 3, the panel display control part 101 displays a screen illustrated in FIG. 5.

Figure 5:
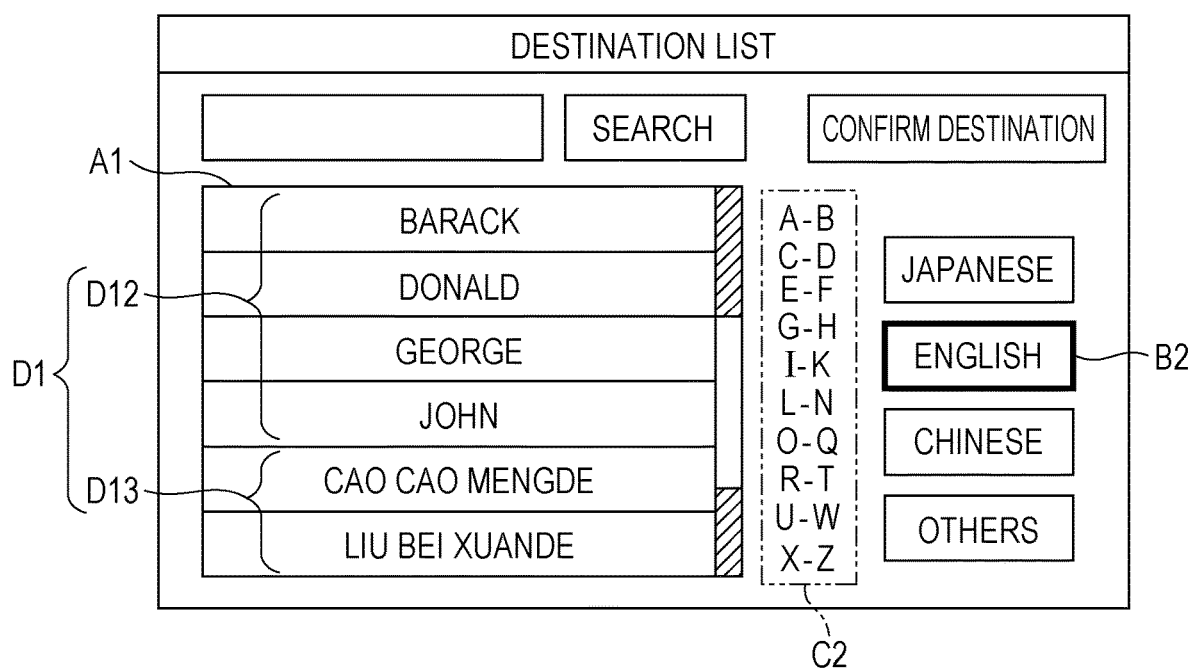
FIG. 5 illustrates a display example when a group selection button is selected.

FIG. 5 illustrates a display example when a group selection button is selected. In the example of FIG. 5, English is selected via the English selection button B2 and therefore the panel display control part 101 displays an English index C2 associated with English. In this exemplary embodiment, ten index images are vertically displayable in the index display area. The English alphabet has a total of 26 characters and 26÷10=2 with the remainder of 6.

In this exemplary embodiment, the panel display control part 101 uses a method involving adding the remainder to a bottom side and determines that the top four index images out of the ten index images show sets of two characters selected in order from the head of the alphabet and the bottom six index images show sets of three characters selected in order. That is, the panel display control part 101 displays the English index C2 so that the numbers of characters shown by the ten index images are 2, 2, 2, 2, 3, 3, 3, 3, 3, and 3, respectively. For example, the first index image shows a character string "A-B" representing a set of A and B and the last index image shows a character string "X-Z" representing a set of X, Y, and Z.

For example, if an index image "C-D" is selected, the index operation receiving part 103 specifies, as the specified character string, a character string (in the example of FIG. 3, "DONALD") located at the top of the destination list D1 among character strings beginning with "C" or "D". In place of the method described above, the panel display control part 101 may use, for example, a method involving adding the remainder to a top side to display the index images so that the top six index images show sets of three characters selected in order or may display index images showing predetermined character combinations (for example, a vowel index image shows one character and a consonant index image shows a combination).

When the index associated with the one or more selected groups is displayed as described above, the index operation receiving part 103 specifies, as the specified character string, any character string out of one or more specific character strings selectable through the operation for the displayed index. For example, when the English index C2 of FIG. 5 is displayed, the index operation receiving part 103 specifies, as the specified character string, any character string out of the one or more specific character strings selectable through the operation for the displayed index, that is, character strings included in the English character string group D12.

In the example of FIG. 5, the index operation receiving part 103 specifies, as the specified character string, "BARACK" located at the top among the character strings included in the English character string group D12 and the panel display control part 101 displays the English character string group D12 in the list display area A1 while locating "BARACK" at the head. In this exemplary embodiment, the list display is synchronized with the displayed index and therefore at least a portion of the character string group in the selected group may be viewed quickly.

If the user sequentially pushes different language selection buttons, the panel display control part 101 of this exemplary embodiment newly displays an index associated with the selected group every time this operation is performed and terminates the previous index display. In this exemplary embodiment, an index associated with one type of group is constantly displayed.

To display the character string group and the index as described above, the panel display control part 101 refers to list information stored in the image processing apparatus 10.

FIG. 6 illustrates an example of the list information. In the list information, character strings in the list, index information, and groups are associated with each other. The index information is used for assisting character string search. Specifically, the index information indicates features of character strings that are included in a character string group and satisfy a specific condition.

In the case of Japanese, the character strings that satisfy the specific condition are character strings beginning with characters in the same Japanese alphabetical array beginning with, for example, "a" or "ka" when characters are expressed in syllabic Japanese scripts. In the case of English, the character strings that satisfy the specific condition are character strings beginning with a specific character. For example, in a case of character strings in a group whose index information is "A-B", the character strings that satisfy the specific condition are character strings beginning with A or B. In the case of Chinese, the character strings that satisfy the specific condition are character strings beginning with a specific character when characters are expressed in pinyin.

FIG. 7 illustrates an example of selection status information. The selection status information indicates selection statuses of groups for index display. In this exemplary embodiment, the selection status information simply reflects the newest selection result. In the example of FIG. 7, the newest selected group is the Japanese group and therefore the Japanese index display is "ON", that is, "displayed" and the index display for the other languages is "OFF", that is, "not displayed".

Every time a new group selecting operation is received, the group selecting operation receiving part 102 makes an update so that index display for a group selected through the selecting operation is turned "ON" and index display for the other groups is turned "OFF". The panel display control part 101 determines the index to be displayed by referring to the selection status information updated in this manner.

Based on the configuration described above, the image processing apparatus 10 performs index display processing for displaying an index of the list of character strings.

Figure 8:
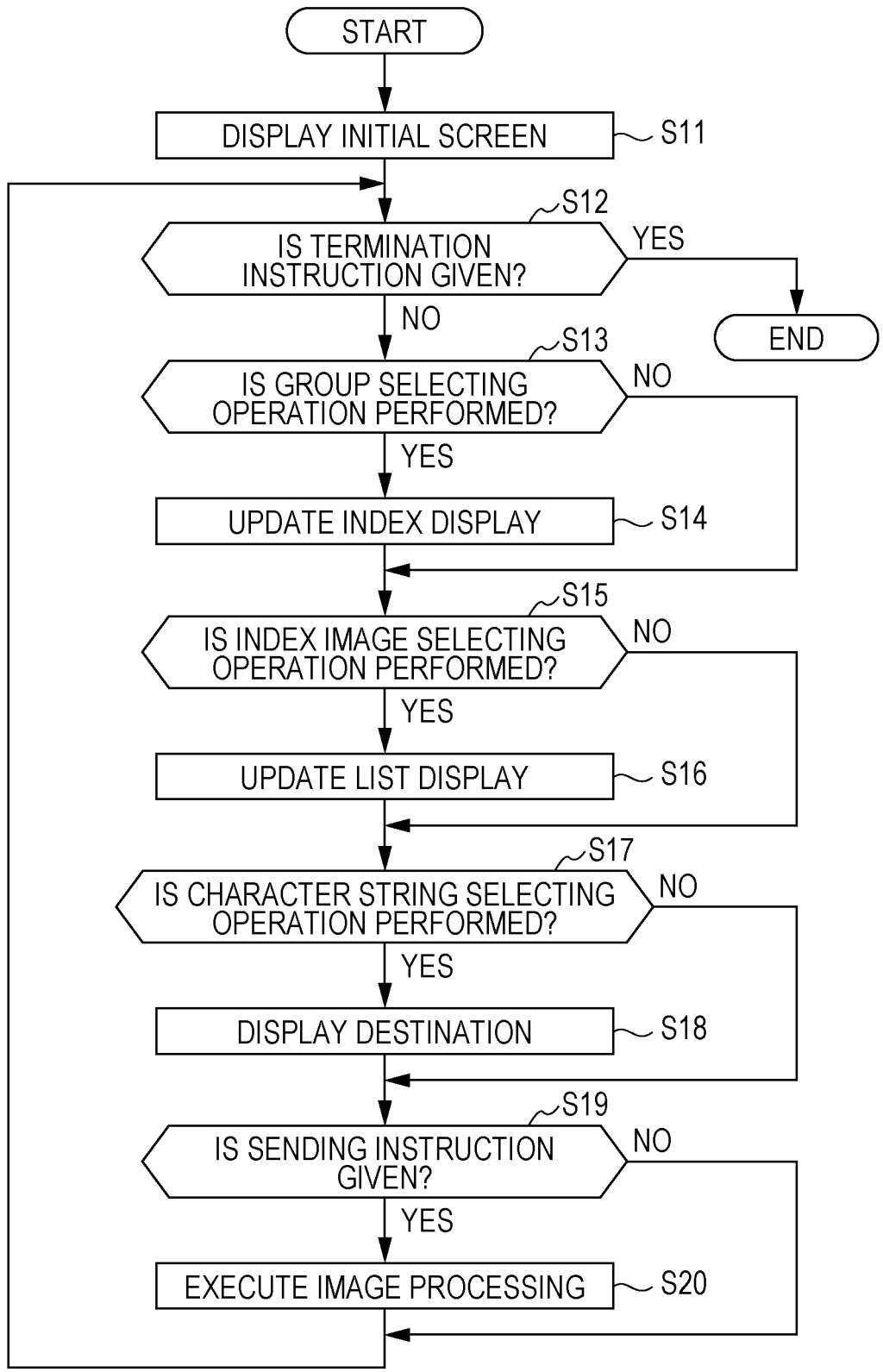
FIG. 8 illustrates an example of an operation procedure of the image processing apparatus.

FIG. 8 illustrates an example of an operation procedure of the image processing apparatus 10. For example, the operation procedure illustrated in FIG. 8 is started when the user sets a document on the image processing apparatus 10 and performs an operation for opening a FAX screen.

First, the panel display control part 101 of the image processing apparatus 10 displays an initial screen on the touch panel of the UI part 16 (Step S11). Next, the panel display control part 101 of the image processing apparatus 10 determines whether an instruction to terminate the operation illustrated in FIG. 8 is given, specifically, whether an operation for closing the FAX screen is performed (Step S12). When the determination result is "YES", the image processing apparatus 10 terminates the operation procedure illustrated in FIG. 8.

When the determination result in Step S12 is "NO", the panel display control part 101 of the image processing apparatus 10 determines whether the group selecting operation receiving part 102 receives a group selecting operation (Step S13). When the determination result is "NO", the processing proceeds to Step S15. When the determination result in Step S13 is "YES", the panel display control part 101 of the image processing apparatus 10 updates the index to be displayed based on the selected group (Step S14).

For example, when the Japanese selection button B1 is selected in FIG. 3, the panel display control part 101 of the image processing apparatus 10 performs control for displaying the index associated with the one or more selected groups, that is, displays the Japanese index C1. Then, the processing proceeds to Step S15. When the processing proceeds to Step S15, the panel display control part 101 of the image processing apparatus 10 determines whether the index operation receiving part 103 receives an index image selecting operation, for example, whether any index image is specified among the plurality of index images of the Japanese index C1 of FIG. 3. When the determination result is "NO", the processing proceeds to Step S17.

When the determination result in Step S15 is "YES", the panel display control part 101 of the image processing apparatus 10 updates the list display for a character string group on the touch panel (Step S16). For example, when the index image represented by "ta" is selected in the Japanese index C1 of FIG. 3, the panel display control part 101 of the image processing apparatus 10 specifies, as the specified character string, a character string beginning with a character in the Japanese alphabetical array beginning with "ta" in the list and displays a character string group beginning with the specified character string in the list display area A1 as exemplified in FIG. 4. Then, the processing proceeds to Step S17.

When the processing proceeds to Step S17, the panel display control part 101 of the image processing apparatus 10 determines whether the character string selecting operation receiving part 104 receives an operation for selecting a character string in the list display area A1. When the determination result is "NO", the processing proceeds to Step S19. When the user specifies a desired character string in the list display area A1 and operates an index image "CONFIRM DESTINATION" in FIG. 3, the character string specified by the user becomes a destination and the determination result in Step S17 becomes "YES".

In this case, the panel display control part 101 of the image processing apparatus 10 displays the destination in a destination display area (blank in FIG. 3) provided above the list display area A1 in FIG. 3 (Step S18). Then, the processing proceeds to Step S19. When the processing proceeds to Step S19, the panel display control part 101 of the image processing apparatus 10 determines whether a sending instruction is given to the image processing apparatus 10.

When the determination result is "NO", the processing returns to Step S12 and similar processing is repeated. When the determination result in Step S19 is "YES", the image processing executing part 106 of the image processing apparatus 10 executes image processing (Step S20). Specifically, the image processing executing part 106 causes the image reading part 17 to read an image of the document and the communication part 14 to send the image to the destination determined in Step S18. Then, the image processing apparatus 10 returns to Step S12 and repeats the operation.

[2] Modified Examples

[2-1] Index Display for Plurality of Groups

In the exemplary embodiment, the panel display control part 101 displays only the index associated with one group but the index display is not limited thereto. In this modified example, the group selecting operation receiving part 102 receives a user's operation for selecting two or more groups and the panel display control part 101 displays two or more indexes associated with the two or more selected groups.

Various operations are conceivable as the operation for selecting two or more groups. For example, the operation is tapping the language selection button twice. When the language selection button is tapped twice, the panel display control part 101 emphasizes the selected language selection button and prevents the emphasis from being terminated even if a different language selection button is selected. Thus, the group associated with the language selection button that is tapped twice is kept in the selected state.

In this modified example, two types of index display method are roughly conceivable. In the first method, the number of index images of the index is fixed similarly to the exemplary embodiment. In this case, as the number of groups associated with indexes increases, the number of index images to be assigned in the index of each group decreases. Therefore, the index functionality decreases and a desired character string becomes difficult to find. In the second method, the number of index images of the index is varied. In this case, as the number of groups associated with indexes increases, the number of index images increases. Therefore, each index image becomes small and the operation becomes difficult to perform.

In both cases, it is not desirable to display indexes of all the groups. Therefore, it is appropriate that the panel display control part 101 display indexes associated with some groups selected from among all the groups.

[2-2] Group Narrowing

Group narrowing may be performed when the group selecting operation receiving part 102 receives the user's operation for selecting two or more groups. For example, the group narrowing is performed when the maximum number of group selecting operations to be received is three but the number of indexes to be displayed is two.

In this modified example, when two or more groups are selected through operations for the language selection buttons, the panel display control part 101 determines that groups that satisfy a predetermined condition (hereinafter referred to as "selection condition") are selected from among the two or more selected groups and displays indexes associated with the groups that satisfy the selection condition. For example, the panel display control part 101 determines that the groups that satisfy the selection condition are a predetermined number of groups selected in order from a group having a larger number of character strings included in the character string group of the selected group.

Figures 9A, 9B, 10:
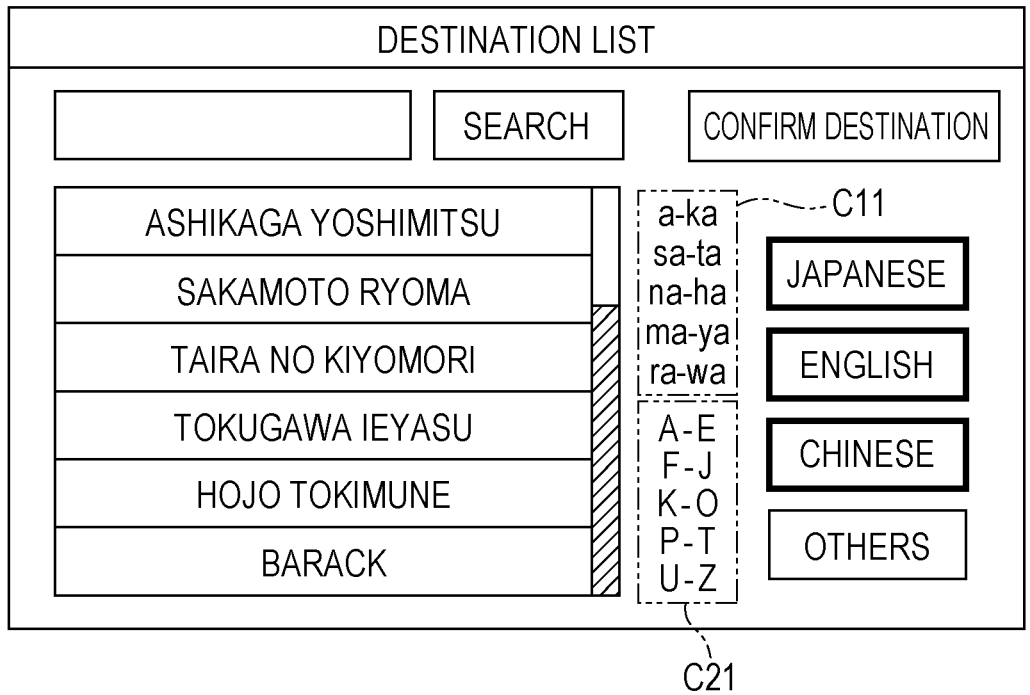
FIGS. 9A and 9B illustrate an example of group narrowing.
FIG. 10 illustrates an example of frequency information.

FIGS. 9A and 9B illustrate an example of the group narrowing. In the example of FIGS. 9A and 9B, the predetermined number is "2" and the group selecting operation receiving part 102 receives selection of three groups of Japanese, English, and Chinese. In the example of FIG. 9A, the panel display control part 101 displays all the three selected language selection buttons with emphasis. In this modified example, the group selecting operation receiving part 102 stores number information indicating the numbers of character strings of indexes of the respective groups.

FIG. 9B illustrates an example of the number information. The number information of FIG. 9B indicates that the numbers are five in Japanese, five in English, four in Chinese, and two in the other languages. Every time groups are selected through the user's operation, the group selecting operation receiving part 102 makes an update so that index display is turned "ON" for the predetermined number of groups selected in order from the group having a larger number of character strings included in the character string group of the selected group.

The panel display control part 101 determines, by referring to the number information, that the groups that satisfy the selection condition are groups whose index display is "ON" (in the example of FIGS. 9A and 9B, the Japanese group and the English group) and displays a Japanese index C11 and an English index C21. In the example of FIGS. 9A and 9B, the indexes are displayed by the method involving fixing the numbers of index images but may be displayed by the method involving varying the numbers of index images as described above.

The group narrowing is performed also in the case in which only an index associated with one type of group is constantly displayed as in the exemplary embodiment. For example, when the user sequentially pushes the language selection buttons, only a language selection button that is selected last is emphasized in the exemplary embodiment but the exemplary embodiment is equivalent to the example of FIGS. 9A and 9B in that a plurality of language selection buttons are operated. In the exemplary embodiment, the panel display control part 101 determines that the groups that satisfy the selection condition are a predetermined number of groups selected in order from a group whose selection timing is later.

When the predetermined number is set to "1" and when the user sequentially pushes the language selection buttons, the panel display control part 101 determines that the group that is selected latest is the group that satisfies the selection condition and displays an index of the group. Also when the selection timing is used as the selection condition, the index may be displayed by the method involving varying the number of index images as described above.

[2-3] Frequency of Use

The panel display control part 101 may determine, as the groups that satisfy the selection condition, that a predetermined number of groups are selected in order from a group having a higher frequency of use of the character string group of the selected group. In this modified example, when an operation for selecting a character string is performed, the character string selecting operation receiving part 104 stores the date and time of use in association with a group to which the selected character string belongs.

For example, when the FAX destination list is displayed, the group selecting operation receiving part 102 calculates the frequencies of use of the character string groups of the indexes of the groups based on the numbers of dates and times of use that are stored in association with the groups. The group selecting operation receiving part 102 reflects the calculated frequencies of use in frequency information in which groups, index display ON/OFF, and frequencies of use are associated with each other.

FIG. 10 illustrates an example of the frequency information. In the frequency information of FIG. 10, frequencies of use of "50", "30", "15", and "20" (monthly basis) are associated with "Japanese", "English", "Chinese", and "others", respectively. In the example of FIG. 10, when the predetermined number is 2 and when the Japanese, English, and Chinese groups are selected, the group selecting operation receiving part 102 makes an update so that index display is turned "ON" for Japanese that is highest in the frequency of use and for English that is second highest in the frequency of use.

The panel display control part 101 determines, by referring to the frequency information, that the groups that satisfy the selection condition are groups whose index display is "ON" (in the example of FIG. 10, the Japanese group and the English group) and displays the Japanese index C11 and the English index C21.

[2-4] Index Display Order and List Display Order

The index display order may be synchronized with the display order of the character string groups included in the destination list D1.

Figure 11A:
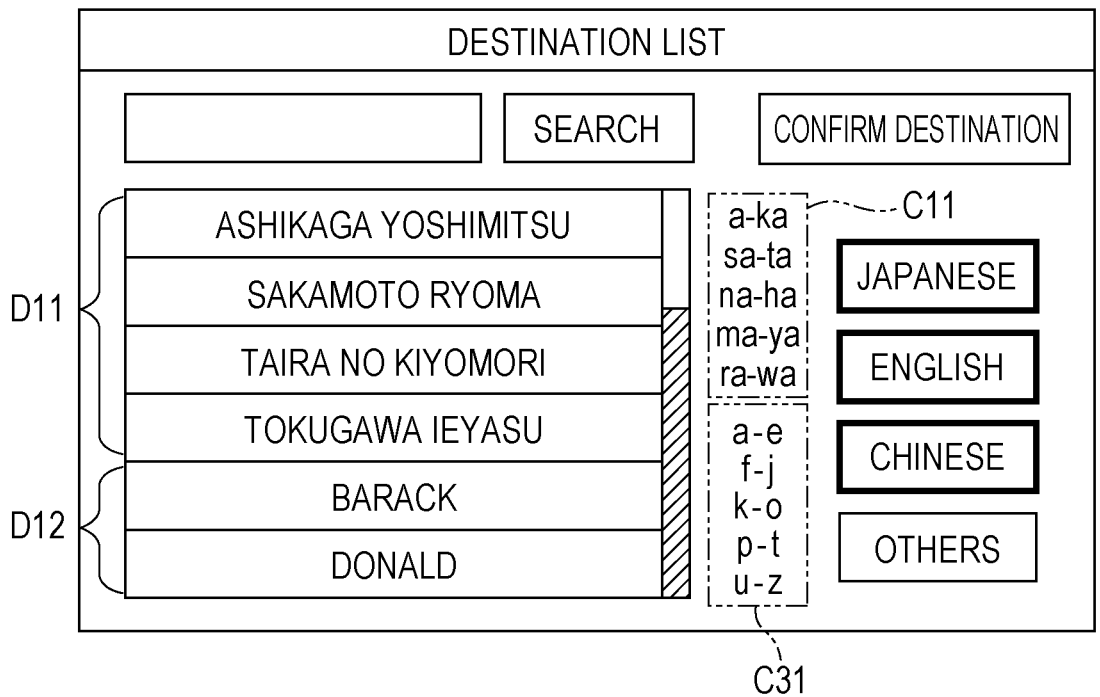
FIGS. 11A and 11B illustrate display examples of indexes and a destination list in a modified example.
Figure 11B:
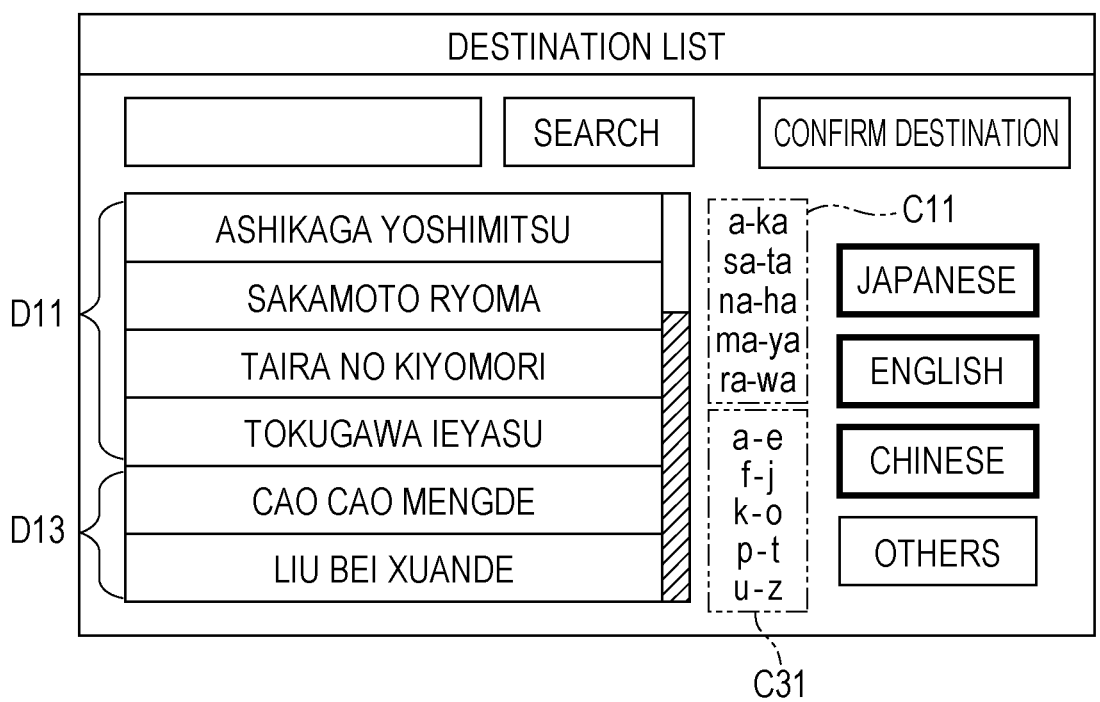

FIGS. 11A and 11B illustrate display examples of the indexes and the destination list in this modified example. In FIG. 11A, when Japanese, English, and Chinese are selected and when the frequency of use of the Japanese character string group is ranked in the first place and the frequency of use of the Chinese character string group is ranked in the second place, the panel display control part 101 displays the Japanese index C11 and a Chinese index C31 in this order.

In FIG. 11A, the panel display control part 101 displays the Japanese character string group D11 and the English character string group D12 in this order without synchronizing the display order of the character string groups included in the destination list D1 with the index display order. In FIG. 11B, the panel display control part 101 displays the Japanese character string group D11 and a Chinese character string group D13 by synchronizing the display order of the character string groups included in the destination list D1 with the index display order.

Whether to synchronize the index display order with the display order of the character string groups included in the destination list D1 may be determined in advance by settings or may be switched through a user's operation.

[2-5] Adjustment of Number of Index Characters

The panel display control part 101 may display the index associated with the one or more selected groups in the index display area with representation of characters, symbols, or combinations thereof in number determined based on the size of the index display area.

Figure 12A:
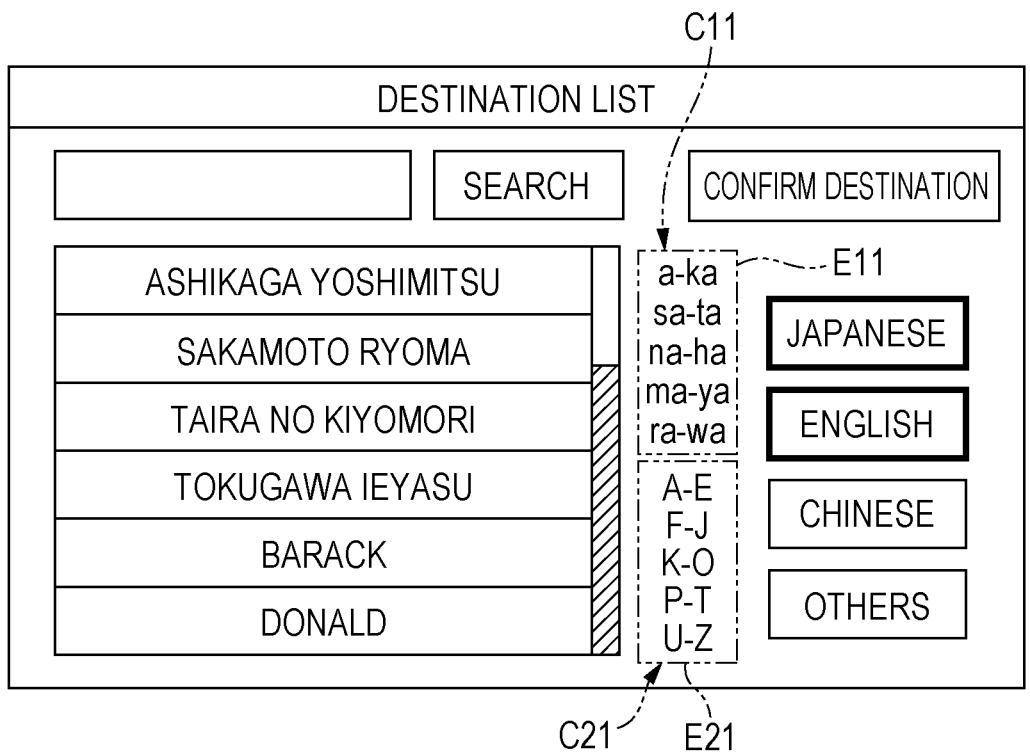
FIGS. 12A and 12B illustrate display examples of indexes in a modified example.
Figure 12B:
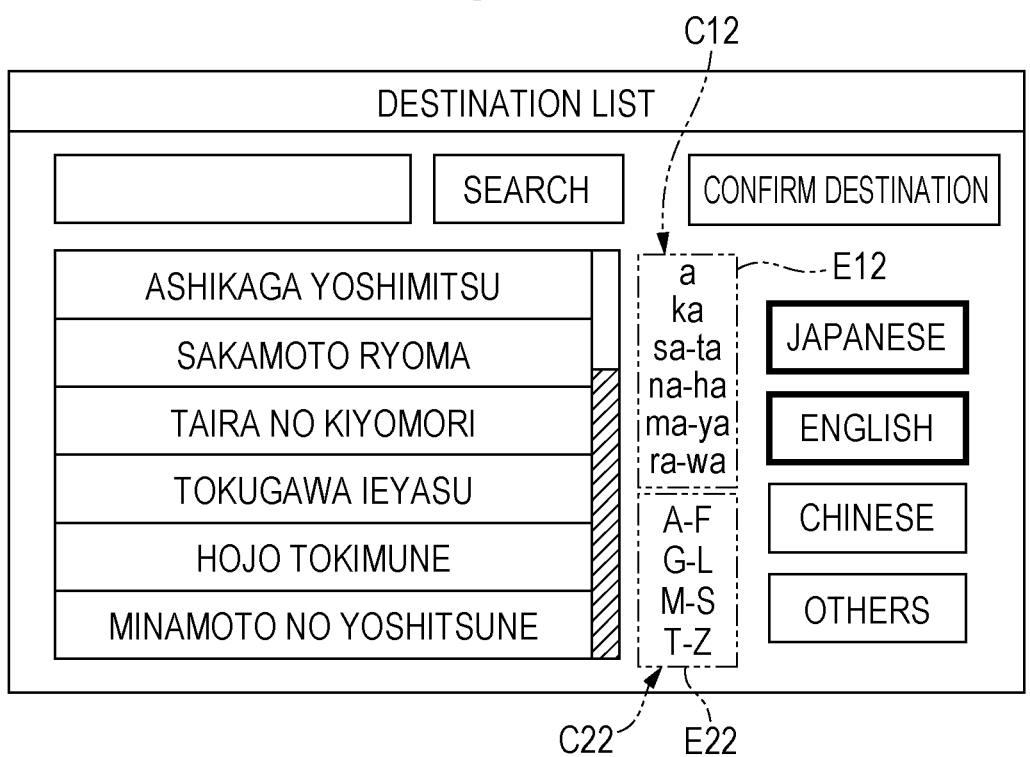

FIGS. 12A and 12B illustrate display examples of the indexes on this modified example. In the example of FIGS. 12A and 12B, the Japanese group and the English group are selected.

In the example of FIG. 12A, the panel display control part 101 displays the Japanese index C11 and the English index C21 in display areas E11 and E21, respectively. In each display area, five index images may be arrayed in the vertical direction. In the case of Japanese, the index needs to cover all the ten characters "a", "ka", "sa" "tan", "na", "ha", "ma", "ya", "ra", and "wa". In this case, 10÷5=2 and therefore the panel display control part 101 divides the ten characters into sets of 2, 2, 2, 2, and 2 and displays, in the display area E11, the Japanese index C11 including five index images each showing two characters.

In the case of English, the index needs to cover all the 26 characters from A to Z. In this case, 26÷5=5 with the remainder of 1 and therefore the panel display control part 101 divides the 26 characters into sets of 5, 5, 5, 5, and 6 and displays, in the display area E21, the English index C21 including five index images showing five, five, five, five, and six characters.

If two or more groups are selected, the panel display control part 101 may allocate the numbers of characters, symbols, or combinations thereof that represent the indexes of the two or more groups based on the numbers of character strings included in the character string groups of the two or more groups. In the example of FIG. 12B, the number of character strings included in the character string group of the Japanese group is larger than the number of character strings included in the character string group of the English group.

Therefore, the number of index images of a Japanese index C12 is set to 6 and the number of index images of an English index C22 is set to 4. Regarding Japanese, 10÷6=1 with the remainder of 4 and therefore the panel display control part 101 uses the method involving adding the remainder to the bottom side as in the exemplary embodiment to divide the ten characters into sets of 1, 1, 2, 2, 2, and 2 and display, in a display area E12, the Japanese index C12 including six index images showing one, one, two, two, two, and two characters.

Regarding English, 26÷4=6 with the remainder of 2 and therefore the panel display control part 101 divides the 26 characters into sets of 6, 6, 7, and 7 and displays, in a display area E22, the English index C22 including four index images showing six, six, seven, and seven characters.

If two or more groups are selected, the panel display control part 101 may allocate the numbers of characters, symbols, or combinations thereof that represent the indexes of the two or more groups based on the frequencies of use of the character string groups of the two or more groups. In the example of FIG. 12B, if the frequency of use of the character string group of the Japanese group is higher than the frequency of use of the character string group of the English group, the number of index images to be displayed in the Japanese index is set larger than the number of index images to be displayed in the English index. Otherwise, the number of index images to be displayed in the Japanese index is set smaller than the number of index images to be displayed in the English index.

In the example of FIGS. 12A and 12B, the panel display control part 101 may display the index by using the method involving adding the remainder to the top side as described above in place of the method involving adding the remainder to the bottom side. The panel display control part 101 may adjust the numbers of characters shown by the plurality of index images associated with one group so that the numbers of characters of character strings beginning with the characters shown by the index images become equal.

The panel display control part 101 may adjust the numbers of characters shown by the plurality of index images associated with one group so that the frequencies of use of the character string groups beginning with the characters shown by the index images become equal.

[2-6] Index Order

If two or more groups are selected, the panel display control part 101 may display the indexes associated with the two or more selected groups so that the indexes are arrayed in order determined based on attributes of the groups. For example, the attribute herein refers to the number of character strings included in the character string group of the selected group.

In this case, the panel display control part 101 displays the indexes so that the indexes are arrayed in order from an index associated with a group having a larger number of character strings under the assumption that the numbers of character strings included in the character string groups of the groups are the attributes of the groups.

Figure 13A:
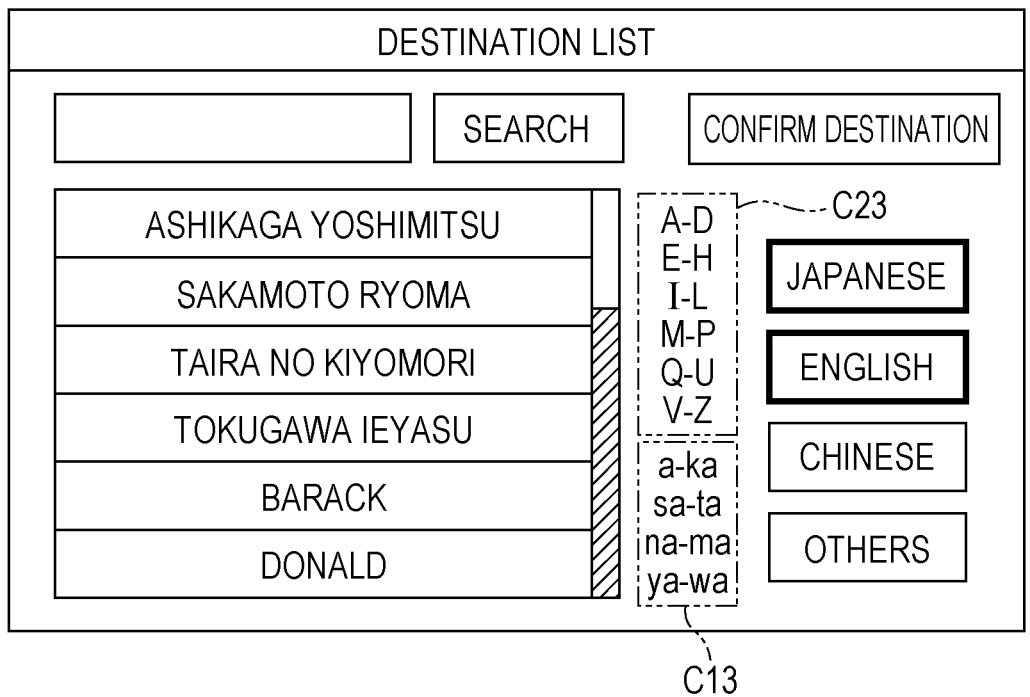
FIGS. 13A and 13B illustrate display examples of indexes and a destination list in a modified example.
Figure 13B:
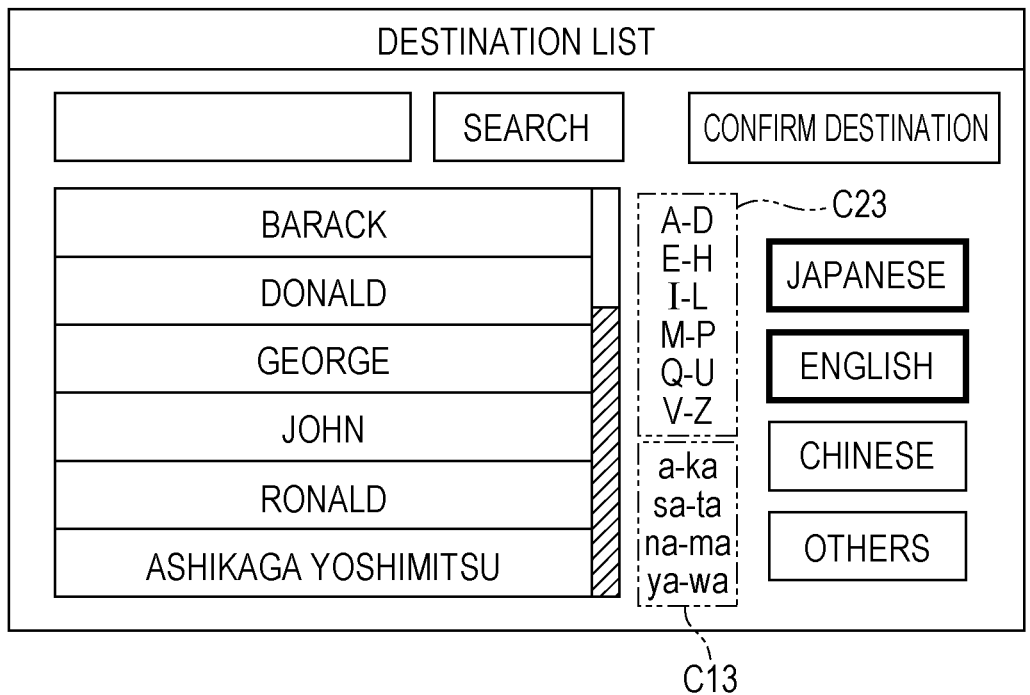

FIGS. 13A and 13B illustrate display examples of the indexes and the destination list in this modified example. In FIGS. 13A and 13B, the Japanese group and the English group are selected and the number of character strings included in the English character string group is larger than the number of character strings included in the Japanese character string group.

Therefore, the panel display control part 101 displays an English index C23 at the top and a Japanese index C13 at the bottom. The English index C23 is associated with the English group that is larger than the Japanese group in the number of character strings included in the character string group.

The panel display control part 101 may display the indexes so that the indexes are arrayed in order from an index associated with a group having a higher frequency of use under the assumption that the frequencies of use of the character string groups of the groups are the attributes of the groups.

Also in this modified example, the index display order may be synchronized with the display order of the character string groups included in the destination list D1. In this case, the panel display control part 101 displays the list linking the character string groups of the plurality of groups in order in common with that of the indexes. In the example of FIGS. 13A and 13B, the panel display control part 101 displays, as illustrated in FIG. 13B, the English character string group prior to (above) the Japanese character string group by synchronizing the display order of the character string groups with the index display order.

[2-7] Fixed Display of Specific Index

The panel display control part 101 may display an index associated with a specific group even if the index is associated with a group that is not selected through the user's operation.

[2-8] Display of Substitute Image

The panel display control part 101 may display a substitute image that substitutes for an index associated with a group that is not selected so that the substitute image is arranged together with the index in order in common with the order of the character string group of the group that is not selected and the character string group of the selected group in the list.

Figure 14A:
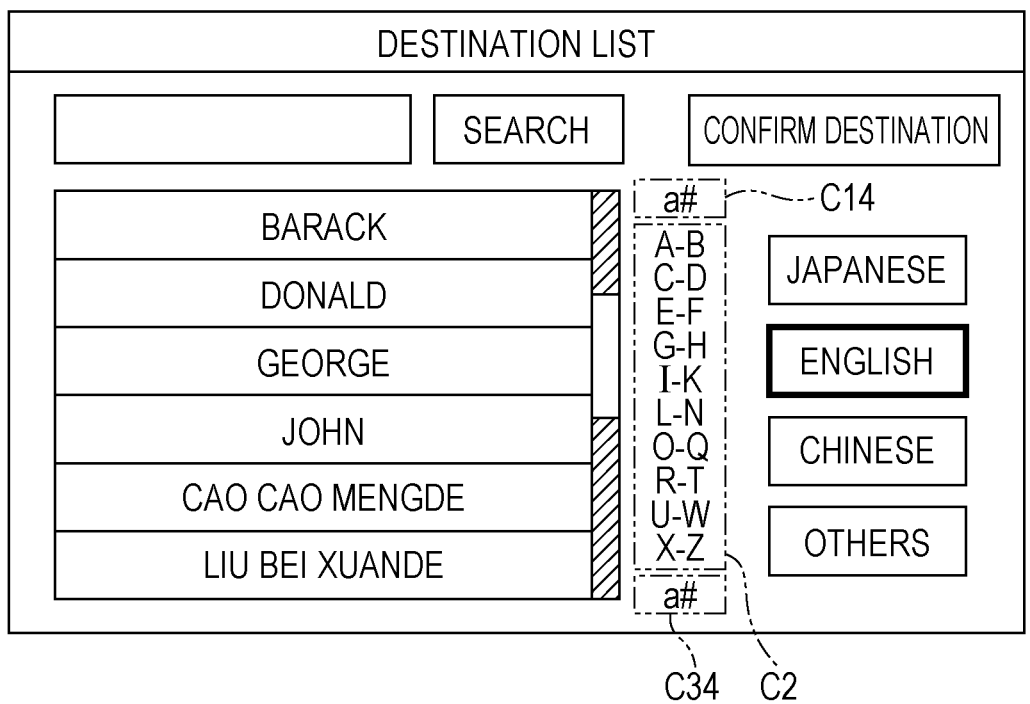
FIGS. 14A and 14B illustrate display examples of a substitute image.
Figure 14B:
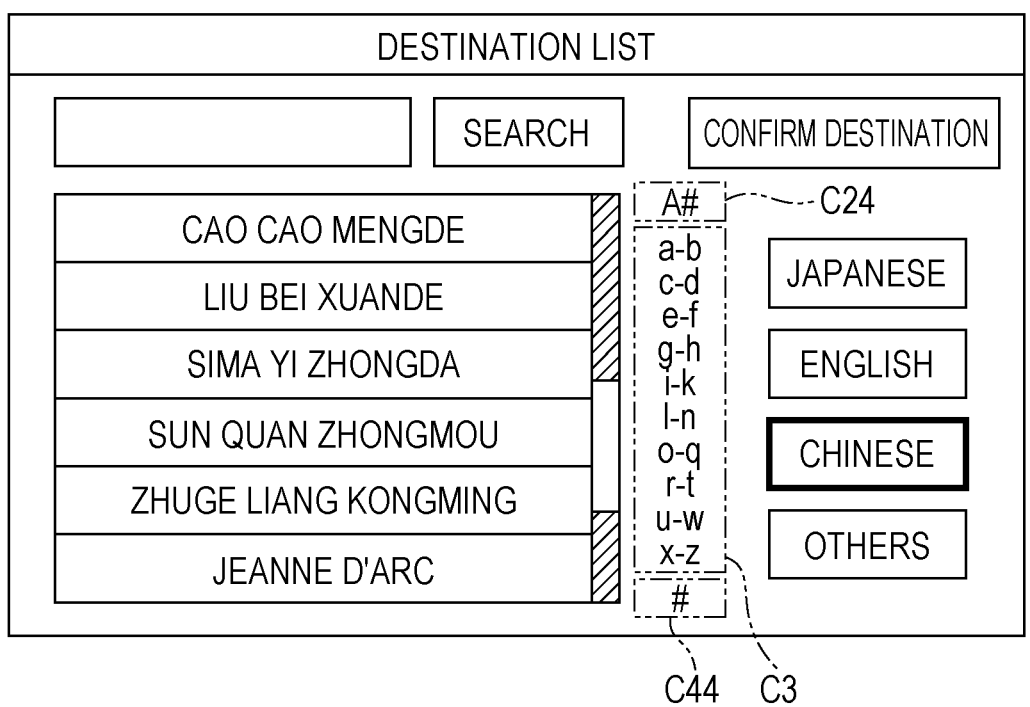

FIGS. 14A and 14B illustrate display examples of the substitute image. In the example illustrated in FIG. 14A, the English group is selected and the panel display control part 101 displays a Japanese substitute image C14 showing the Japanese group above the English index C2, and a Chinese substitute image C34 showing the Chinese group below the English index C2. The panel display control part 101 displays the Japanese substitute image C14, the English index C2, and the Chinese substitute image C34 in this order based on the order of the character string groups in the respective languages in the destination list D1 (order of Japanese, English, and Chinese).

In the example illustrated in FIG. 14B, the Chinese group is selected and the panel display control part 101 displays an English substitute image C24 above a Chinese index C3, and a substitute image C44 associated with the other languages below the Chinese index C3. The panel display control part 101 displays the English substitute image C24, the Chinese index C3, and the substitute image C44 in this order based on the order of the character string groups in the respective languages in the destination list D1 (order of English, Chinese, and the other languages).

[2-9] Character String Order

In the exemplary embodiment, the character strings included in the list are arrayed in ascending order but may be arrayed in descending order. The character strings may be arrayed in unique order (for example, order of registration, update, or creators) based on certain factors in the character strings instead of the ascending or descending order.

[2-10] Devices that Implement Respective Parts

The devices that implement the respective functions illustrated in FIG. 2 are not limited to the devices illustrated in the figures. For example, a subset of the functions of the image processing apparatus 10 may be implemented by other devices. In the examples described above, the panel display control part 101 performs all of the index image display control, the index display control, and the list display control but different functions may perform the respective types of display control. In this case, the respective display control functions cooperate with each other to serve as the "controller" of the exemplary embodiment of the present disclosure. In short, assignment of the functions among the devices and the operation ranges of the respective functions may freely be set if the functions illustrated in FIG. 2 are implemented by the image processing apparatus or a plurality of devices as a whole.

[2-11] Category of Exemplary Embodiment of Disclosure

The exemplary embodiment of the present disclosure may be provided not only as the information processing apparatus such as the image processing apparatus but also as an information processing method for implementing the processing to be performed by the information processing apparatus or as a program causing the computer to exert the function of controlling the information processing apparatus. The program may be provided in the form of a recording medium such as an optical disc that stores the program or may be provided by being downloaded into the computer via a communication network such as the Internet and installed for use.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus, comprising:
a processor configured to:
perform control so that:
a portion including a specified character string, which is specified through an operation by a user, in a list linking a plurality of character string groups belonging to a plurality of groups is displayed in a display area,
graphical user interface ("GUI") elements are displayed to receive a first selection of a selectable GUI element of the GUI elements by the user which in turn is configured to select one or more groups out of the plurality of groups, and
in response to receiving a selection of the selectable GUI element selecting the one or more selected groups, an index uniquely associated with the selected selectable GUI element and the one or more selected groups is configured (1) to be displayed among a plurality of indexes that are associated with the plurality of groups and (2) for receiving a second selection by the user that, when selected, is configured for selecting a specific character string included in the character string groups, such that when a first selectable GUI element is selected, a first index associated with the first selectable GUI element is displayed but in response to a second selectable GUI element is selected, a second index associated with the second selectable GUI element is displayed instead of the first index; and
specify, as the specified character string, the specific character string selected through the operation for the displayed index.

2. The information processing apparatus according to claim 1, wherein, when the index associated with the one or more selected groups is displayed, the specifier specifies, as the specified character string, any character string out of one or more specific character strings selectable through the operation for the index.

3. The information processing apparatus according to claim 1, wherein, when two or more groups are selected, the controller determines that a group that satisfies a predetermined condition is selected from among the two or more groups and displays an index associated with the group.

4. The information processing apparatus according to claim 3, wherein the controller determines, as the group that satisfies the condition, that a predetermined number of groups are selected in order from a group whose selection timing is later.

5. The information processing apparatus according to claim 3, wherein the controller determines, as the group that satisfies the condition, that a predetermined number of groups are selected in order from a group having a larger number of character strings included in a character string group of the group.

6. The information processing apparatus according to claim 3, wherein the controller determines, as the group that satisfies the condition, that a predetermined number of groups are selected in order from a group having a higher frequency of use of a character string group of the group.

7. The information processing apparatus according to claim 1, wherein the controller displays the index associated with the one or more selected groups in an index display area with representation of characters, symbols, or combinations of the characters and the symbols in number determined based on a size of the index display area.

8. The information processing apparatus according to claim 7, wherein, when two or more groups are selected, the controller allocates the numbers of characters, symbols, or combinations of the characters and the symbols that represent indexes of the two or more groups based on the numbers of character strings included in character string groups of the two or more groups.

9. The information processing apparatus according to claim 7, wherein, when two or more groups are selected, the controller allocates the numbers of characters, symbols, or combinations of the characters and the symbols that represent indexes of the two or more groups based on frequencies of use of character string groups of the two or more groups.

10. The information processing apparatus according to claim 1, wherein, when two or more groups are selected, the controller displays indexes associated with the two or more groups so that the indexes are arrayed in order determined based on attributes of the groups.

11. The information processing apparatus according to claim 10, wherein the controller displays the indexes so that the indexes are arrayed in order from an index associated with a group having a larger number of character strings included in a character string group of the group under an assumption that the numbers of character strings included in character string groups of the groups are the attributes of the groups.

12. The information processing apparatus according to claim 10, wherein the controller displays the indexes so that the indexes are arrayed in order from an index associated with a group having a higher frequency of use of a character string group of the group under an assumption that frequencies of use of character string groups of the groups are the attributes of the groups.

13. The information processing apparatus according to claim 10, wherein the controller displays the list linking the character string groups of the plurality of groups in order in common with the order of the indexes.

14. The information processing apparatus according to claim 1, wherein the controller displays an index associated with a specific group even if the index is associated with a group that is not selected through the operation by the user.

15. The information processing apparatus according to claim 1, wherein the controller displays a substitute image that substitutes for an index associated with a group that is not selected so that the substitute image is arranged together with the index associated with the one or more selected groups in order in common with order of a character string group of the group that is not selected and a character string group of the one or more selected groups in the list.

16. A non-transitory computer readable medium storing a program causing a computer to execute a process, the process comprising:
performing control so that a portion including a specified character string, which is specified through an operation by a user, in a list linking a plurality of character string groups belonging to a plurality of groups is displayed in a display area, graphical user interface ("GUI") elements are displayed to receive a first selection of a selectable GUI element of the GUI elements by the user which in turn is configured to select one or more groups out of the plurality of groups, and in response to receiving a selection of the selectable GUI element selecting the one or more selected groups, an index uniquely associated with the selected selectable GUI element and the one or more selected groups is configured (1) to be displayed among a plurality of indexes that are associated with the plurality of groups and (2) for receiving a second selection by the user that, when selected, is configured for selecting a specific character string included in the character string groups, such that when a first selectable GUI element is selected, a first index associated with the first selectable GUI element is displayed but in response to a second selectable GUI element is selected, a second index associated with the second selectable GUI element is displayed instead of the first index; and
specifying, as the specified character string, the specific character string selected through the operation for the displayed index.

17. An information processing apparatus, comprising:
control means for performing control so that a portion including a specified character string, which is specified through an operation by a user, in a list linking a plurality of character string groups belonging to a plurality of groups is displayed in a display area, graphical user interface ("GUI") elements are displayed to receive a first selection of a selectable GUI element of the GUI elements by the user which in turn is configured to select one or more groups out of the plurality of groups, and in response to receiving a selection of the selectable GUI element selecting the one or more selected groups, an index uniquely associated with the selected selectable GUI element and the one or more selected groups is configured (1) to be displayed among a plurality of indexes that are associated with the plurality of groups and (2) for receiving a second selection by the user that, when selected, is configured for selecting a specific character string included in the character string groups, such that when a first selectable GUI element is selected, a first index associated with the first selectable GUI element is displayed but in response to a second selectable GUI element is selected, a second index associated with the second selectable GUI element is displayed instead of the first index; and
specifying means for specifying, as the specified character string, the specific character string selected through the operation for the displayed index.

\* \* \* \* \*